United States Patent
Cho et al.

(10) Patent No.: US 11,363,522 B2
(45) Date of Patent: Jun. 14, 2022

(54) METHOD OF CONTROLLING ELECTRONIC APPARATUS AND COMPUTER-READABLE RECORDING MEDIUM

(71) Applicant: SAMSUNG ELECTRONICS CO., LTD., Suwon-si (KR)

(72) Inventors: Eun-joo Cho, Hwaseong-si (KR); Hyeon-ji Lee, Seoul (KR); Chang-seog Ko, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 16/252,078

(22) Filed: Jan. 18, 2019

(65) Prior Publication Data

US 2020/0022072 A1     Jan. 16, 2020

(30) Foreign Application Priority Data

Jul. 11, 2018  (KR) .................. 10-2018-0080401

(51) Int. Cl.
*H04W 48/16* (2009.01)
*G06T 7/70* (2017.01)
*H04N 5/232* (2006.01)

(52) U.S. Cl.
CPC .............. *H04W 48/16* (2013.01); *G06T 7/70* (2017.01); *H04N 5/23218* (2018.08); *H04N 5/232933* (2018.08)

(58) Field of Classification Search
CPC ......... H04L 67/36; H04L 67/38; H04L 67/16; H04L 12/2809; H04W 48/16; G06T 7/70; G06T 11/00; H04N 5/23218; H04N 5/232933; H04M 2250/52; H04M 1/72533; H04M 1/72544

See application file for complete search history.

(56) References Cited

U.S. PATENT DOCUMENTS

| 8,988,247 B1 | 3/2015 | Lee et al. |
| 9,871,958 B2 | 1/2018 | Eun et al. |

(Continued)

FOREIGN PATENT DOCUMENTS

| JP | 2011-205485 A | 10/2011 |
| KR | 10-1444407 B1 | 9/2014 |

(Continued)

OTHER PUBLICATIONS

Communication dated Mar. 21, 2019 issued by the European Intellectual Property Office in counterpart European Application No. 19152741.5.

(Continued)

*Primary Examiner* — Oussama Roudani
(74) *Attorney, Agent, or Firm* — Sughrue Mion, PLLC

(57) ABSTRACT

A method for controlling an electronic apparatus is provided. The method includes, based on a user input for registering an external device being received, performing capturing through a camera of the electronic apparatus and obtaining an image, identifying a registrable device from among at least one device included in the image based on a signal received from an external device, displaying a graphic object indicating the registrable device in the image, and based on a user input for registering the registrable device being received, registering the registrable device as a controllable device.

13 Claims, 19 Drawing Sheets

(56) References Cited

U.S. PATENT DOCUMENTS

| | | |
|---|---|---|
| 2012/0105447 A1 | 5/2012 | Kim |
| 2012/0143355 A1 | 6/2012 | Honma et al. |
| 2012/0188155 A1 | 7/2012 | Eun et al. |
| 2013/0195367 A1 | 8/2013 | Ohira et al. |
| 2014/0191855 A1* | 7/2014 | Kim .............. G08C 17/02 340/12.54 |
| 2014/0250022 A1 | 9/2014 | Lee et al. |
| 2015/0133051 A1* | 5/2015 | Jamal-Syed ........... H04W 4/21 455/41.2 |
| 2015/0348403 A1* | 12/2015 | Berelejis ............ H04L 12/2809 367/197 |
| 2016/0037573 A1 | 2/2016 | Ko et al. |
| 2017/0134553 A1* | 5/2017 | Jeon .............. H04W 4/08 |
| 2017/0244574 A1 | 8/2017 | Moon et al. |
| 2018/0097981 A1 | 4/2018 | Eun et al. |
| 2019/0259211 A1* | 8/2019 | Nakajima ............ G02B 27/02 |
| 2019/0385043 A1* | 12/2019 | Choudhary ......... G06N 3/0454 |
| 2020/0081090 A1* | 3/2020 | Marshall ............. G01S 5/0018 |

FOREIGN PATENT DOCUMENTS

| | | |
|---|---|---|
| KR | 10-2015-0026329 A | 3/2015 |
| KR | 10-2015-0054366 A | 5/2015 |
| KR | 10-1722784 B1 | 4/2017 |
| KR | 10-1730180 B1 | 4/2017 |
| KR | 10-2017-0078459 A | 7/2017 |
| KR | 10-2018-0029002 A | 3/2018 |

OTHER PUBLICATIONS

International Search Report dated May 14, 2019 issued by the International Searching Authority in counterpart Application No. PCT/KR2019/001625 (PCT/ISA/210).

Written Opinion dated May 14, 2019 issued by the International Searching Authority in counterpart Application No. PCT/KR2019/001625 (PCT/ISA/237).

* cited by examiner

METHOD OF CONTROLLING ELECTRONIC APPARATUS AND COMPUTER-READABLE RECORDING MEDIUM

CROSS-REFERENCE TO RELATED APPLICATION(S)

This application is based on and claims priority under 35 U.S.C. § 119(a) from Korean Patent Application No. 10-2018-0080401, filed on Jul. 11, 2018, in the Korean Intellectual Property Office, the disclosure of which is incorporated by reference herein in its entirety.

BACKGROUND

1. Field

The disclosure relates to a method of controlling an electronic apparatus and a computer-readable recording medium storing a program for controlling an electronic apparatus. More particularly, the disclosure relates to a method of controlling an electronic apparatus capable of more intuitively registering a device to be controlled, and a program therefor.

2. Description of Related Art

The advancement of computer technology, communication technology, and home electronics technology has introduced a network management service in which devices and systems in the home and factory are connected to and managed via a network, which has emerged as a future-oriented technology.

All devices in the home and factory connected via a network are capable of transmitting data to one another, and may communicate with various electronic apparatuses. For example, a user may control all home appliances in the home by using a user interface (UI) provided in an electronic apparatus such as a smartphone and the like, without regard to time and location.

To use this service, it is necessary to initialize a device to be controlled, and for device installation, a procedure to register the device in a smartphone and/or a server is required.

According to the related art, a device is registered using a smartphone application. However, only a list of registrable apparatuses is provided and thus, it is difficult to identify with precision the identity of a device that appears in the list. Furthermore, to register a number of devices, it is necessary that a user directly registers each of the devices in order, which is inconvenient.

The above information is presented as background information only to assist with an understanding of the disclosure. No determination has been made, and no assertion is made, as to the applicability of the background information with regard to the disclosure.

SUMMARY

Aspects of the disclosure address at least the above-mentioned problems and/or disadvantages and to provide at least the advantages described below. Accordingly, an aspect of the disclosure is to provide a method of controlling an electronic apparatus capable of more intuitively registering a device to be controlled, and a program therefor.

In accordance with an aspect of the disclosure, there is provided a method of controlling a controlled device through an electronic device, the method including: based on a user input for registering the at least one external device being received, capturing an image including a plurality of devices through a camera of the electronic device; identifying at least one registrable device from among the plurality of devices included in the image; displaying at least one graphic object on the identified at least one registrable device in the image, wherein the at least one graphic object indicates that the at least one registrable device is registrable on the electronic device; and based on the user input for selecting the at least one graphic object, registering at least one registrable device corresponding to the selected at least one graphic object on the electronic device.

The method may further include receiving state information of the controlled device from a server, wherein the displaying comprises displaying the image together with an indication of the state information.

The method may further include displaying a user interface (UI) for controlling the at least one registered device; and transmitting a control command to control the at least one registered device based on receiving a user input via the UI for controlling the at least one registered device.

The identifying may include identifying the at least one device included in the image through image analysis.

The displaying the graphic object may include displaying a text indicating the at least one registrable device based on a type of the at least one device which is identified through the image analysis.

The identifying may include identifying a position of at least one device included in the image through image analysis; identifying a position of the at least one external device based on a strength and phase difference of a signal received from the at least one external device; comparing a position of at least one device in the image based on the image analysis with a position indicated by the strength and the phase difference of the signal; and identifying the at least one registrable device based on a result of the comparing.

The displaying the graphic object may include displaying the graphic object comprises displaying a text indicating the at least one registrable device based on a service set identifier (SSID) included in the received signal.

The method may further include based on a plurality of registrable devices being identified in the image and the plurality of registrable devices being registered as controllable devices, designating the plurality of registered devices as a first group.

The method may further include based on a user input for checking a state of the first group being received, providing the image and a user interface (UI) including information about states of the plurality of registered devices.

The registering may include, based on receiving a user input for registering the at least one registrable device, receiving device information from the at least one registrable device, and transmitting a registration request on the basis of the received device information to a server.

The registering may include, based on the plurality of registrable devices being identified in the image and receiving a user input for registering the plurality of registrable devices, sequentially receiving device information from the plurality of registrable devices and transmitting a registration request on the basis of the received device information to a server.

In accordance with an aspect of the disclosure, there is provided a non-transitory computer-readable storage medium configured to store computer executable instructions that, when executed by a processor of an electronic apparatus, cause the electronic device to perform a method of registering at least one external device on an electronic device including: based on a user input for registering the at least one external device being received, capturing an image including a plurality of devices through a camera of the electronic device; identifying at least one registrable device from among the plurality of devices included in the image; displaying at least one graphic object on the identified at least one registrable device in the image, wherein the at least one graphic object indicates that the at least one registrable device is registrable on the electronic device; and based on user input for selecting the at least one graphic object, registering at least one registrable device corresponding to the selected at least one graphic object on the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
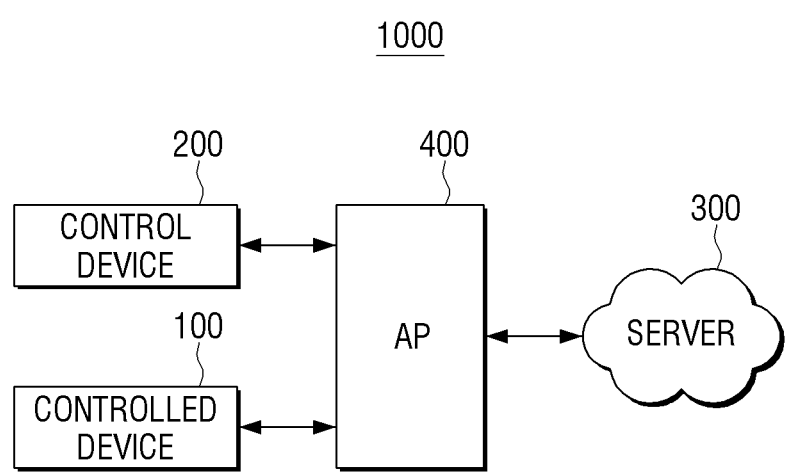
FIG. 1 is a diagram illustrating a system, according to an embodiment.

The above and other aspects, features, and advantages of certain embodiments of the present disclosure will be more apparent from the following description taken in conjunction with the accompanying drawings, in which: However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

In the description, the term "has", "may have", "includes" or "may include" indicates existence of a corresponding feature (e.g., a numerical value, a function, an operation, or a constituent element such as a component), but does not exclude existence of an additional feature.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

If it is described that a certain element (e.g., first element) is "operatively or communicatively coupled with/to" or is "connected to" another element (e.g., second element), it should be understood that the certain element may be connected to the other element directly or through still another element (e.g., third element). Meanwhile, when it is mentioned that one element (e.g., first element) is "directly coupled" with or "directly connected to" another element (e.g., second element), it may be understood that there is no element (e.g., third element) present between the element and the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, the phrase "processor configured to perform A, B, and C" may denote or refer to a dedicated processor (e.g., embedded processor) for performing the corresponding operations or a generic-purpose processor (e.g., CPU or application processor) that can perform the corresponding operations through execution of one or more software programs stored in a memory device.

The terms used in the description are used to merely describe a specific embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the present disclosure belongs. The terms that are used in the present disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the present disclosure should not be interpreted as excluding the embodiments of the disclosure.

An electronic apparatus (including a control device and a device to be controlled) according to embodiments of the disclosure may include, for example, at least one of a smart phone, a tablet PC (Personal Computer), a mobile phone, a video phone, an e-book reader, a desktop PC (Personal Computer), a laptop PC (Personal Computer), a net book computer, a workstation, a server, a PDA (Personal Digital Assistant), a PMP (Portable Multimedia Player), an MP3 player, a mobile medical device, a camera, and a wearable device. According to embodiments, a wearable device may include at least one of an accessory type (e.g., watch, ring, bracelet, ankle bracelet, necklace, glasses, contact lens, or head-mounted-device (HMD)), fabric or cloth-embedded type (e.g., e-cloth), body-attached type (e.g., skin pad or tattoo), or bioimplant circuit (e.g., implantable circuit).

In an implementation, an electronic apparatus may be home appliance. The home appliance may, for example, include at least one of a television, a digital video disk (DVD) player, a stereo, a refrigerator, an air conditioner, a cleaner, an oven, a microwave, a washing machine, an air purifier, a set-top box, a home automation control panel, a security control panel, a TV box (e.g., Samsung Home-Sync™, an Apple TV™, or a Google TV™), a game console (e.g., Xbox™ and PlayStation™), an electronic dictionary, an electronic key, a camcorder, and an electronic frame.

In an embodiment, an electronic apparatus may include various medical devices (e.g., various portable medical measuring devices (blood glucose monitor, heart rate monitor, blood pressure measuring device, or body temperature measuring device, etc.), magnetic resonance angiography (MRA), magnetic resonance imaging (MRI), computed tomography (CT), photographing device, or ultrasonic device, etc.), navigator, global navigation satellite system (GNSS), event data recorder (EDR), flight data recorder (FDR), vehicle info-tainment device, e-device for ships (ex: navigation device for ship, gyrocompass, etc.), avionics, security device, head unit for vehicles, industrial or home-use robots, automatic teller machine (ATM) of financial institutions, point of sales (POS) of shops, or internet of things device (e.g., bulb, sensors, electrical meter or gas meter, sprinkler, fire alarm, thermostat, streetlight, toaster, sporting goods, hot water tank, heater, boiler, etc.).

According to embodiments, an electronic apparatus may include at least one of furniture, a part of a building/construction, electronic board, electronic signature receiving device, projector, or various measuring devices (e.g., water, electricity, gas, or wave measuring device, etc.). In embodiments, the electronic apparatus may be a combination of one or more of the above-described apparatuses. In a certain embodiment, the electronic apparatus may be a flexible electronic apparatus. Further, the electronic apparatus according to the embodiments is not limited to the above-described apparatuses, but may include new electronic apparatuses in accordance with the technical development.

FIG. 1 is a diagram illustrating a system 1000, according to an embodiment.

Referring to FIG. 1, the system 1000 may include a controlled device 100, a control device 200, a server 300, and an access point (AP) 400.

The controlled device 100 may be, for example, a home appliance, such as a TV, air conditioner, refrigerator, washing machine, robot cleaner, humidifier, door-lock, dishwasher, security camera, closed circuit television (CCTV), security sensor, light emitting diode (LED), lamp, heater, electricity meter, power socket, electric socket, multi tap, personal computer (PC), IP camera, Internet phone, wire/wireless phone, an electrically-controllable curtain, blind, and the like.

The controlled device 100 is an electronic apparatus provided with a communication function, which may, for example, communicate with an external apparatus and/or the control device 200 through a communication method, such as Wi-Fi, ZigBee, Z-Wave, Bluetooth, and the like. However, the example is not limited thereto.

The control device 200 may, for example, be an electronic apparatus, such as a smartphone, a tablet PC, a remote controller, a personal computer, a TV, and the like.

The control device 200 is an electronic apparatus provided with a communication function, which may, for example, communicate with an external apparatus and/or the controlled device 100 through a communication method, such as Wi-Fi, ZigBee, Z-Wave, Bluetooth, and the like. However, the example is not limited thereto.

The control device 200 is an apparatus capable of performing registration, controlling, management, etc. of the controlled device 100. The control device 200 may register the controlled device 100 in the server 300 and identify a state of the controlled device 100 and transmit messages and/or commands to the controlled device 100 to control or operate the controlled device 100.

The control device 200 may communicate with the controlled device 100 via the server 300 or by using a peer-to-peer (P2P) connection.

The access point (AP) 400 is a wireless device serving as a base station in a wireless LAN that acts as a bridge between wired communication hardware and wireless communication hardware. The AP may be implemented in a router or a switch from the perspective of the wired network and accordingly, the AP may expand the wired network to the wireless network. For example, the AP may be implemented as an IP distribution or assignment (e.g., DHCP) mechanism connected to a modem, a wireless network card, or the like.

The controlled device 100 and the control device 200 may communicate with another external device connected to the AP 400 or the server 300 via the AP 400.

The server 300 may be implemented as a cloud server. According to an embodiment, the server 300 may include an account server and a service server. The account server may perform a user authentication. The service server may provide functions, such as a web portal, state information management of devices, remote access, updating of a device, message notification, and the like.

The services provided by the system 1000 may be largely divided into device registration and device control.

The registration may, for example, include at least one of a procedure in which the control device 200 is communicatively connected to the controlled device 100, a procedure in which the control device 200 supports the controlled device 100 to access the access point (AP) 400, and a procedure to register the controlled device 100 in the control device 200 and the server 300.

The control is, for example, a procedure to, after the controlled device 100 is registered, control the controlled device 100 via the server 300 by using the control device 200 or control the controlled device 100 by using the control device 200 without regard to the server 300.

The controlled device 100 and the control device 200 may be called home devices, if used in the home. The controlled device 100 and the control device 200 may directly communicate with the server 300, or may communicate via a home gateway. The home gateway may be registered with the server 300, and manage and control home devices in the home network including the controlled device 100 and the control device 200. In addition, the home gateway may support message translation between a ZigBee or Z-Wave-based device and a Wi-Fi-based device.

The control device 200 may provide a variety of services to a user through a smart control application. The smart control application is a program executed on an operating system (OS) of the control device 200, which may be embedded in the control device 200 by default or downloaded from an application store, such as Google Play™ and Samsung Apps™. The control device 200 may perform registration, controlling, management, etc. of the controlled device 100 through a smart control application. The term "smart control application" used herein is only an example, and may be called "computer executable instructions" or a computer program.

The smart control application may provide a variety of services through various hardware elements of the control device 200.

Figure 2:
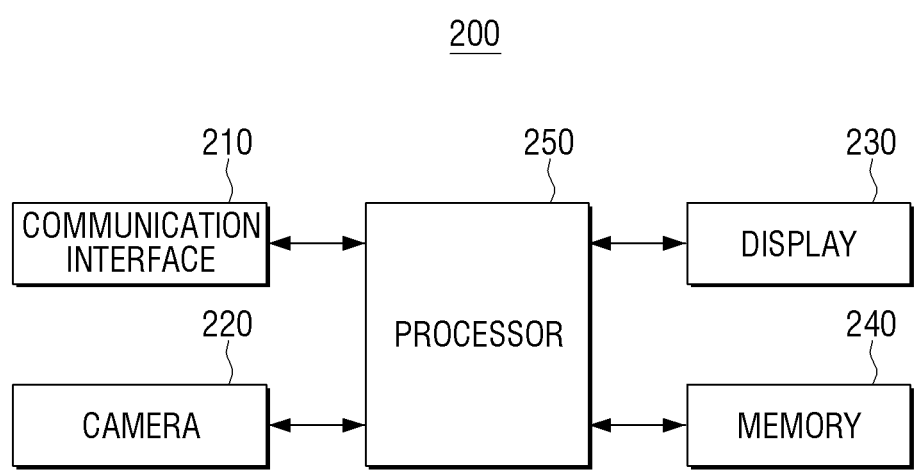
FIG. 2 is a block diagram of a control device, according to an embodiment.

FIG. 2 is a diagram of a control device 200, according to an embodiment. The control device 200 may be any electronic apparatus capable of performing the functions described in the disclosure.

Referring to FIG. 2, the control device 200 may include a communication interface 210, a camera 220, a display 230, a memory 240, and a processor 250. According to an implementation form, appropriate hardware/software configurations apparent to those skilled in the art may be further included in the control device 200. In addition, according to an implementation form, some elements may be excluded.

The communication interface 210 is configured to communicate with various kinds of external devices. The communication interface 210 may communicate with an external device in a communication method or protocol, such as a Wi-Fi, Bluetooth, NFC, infrared data association (IrDA), radio frequency identification (RFID), ultra-wideband (UWB), Wi-Fi Direct, Z-wave, ZigBee, 4LoWPAN, GPRS, Weightless, digital living network alliance (DLNA), ANT+, digital enhanced cordless telecommunications (DECT), wireless local area network (WLAN), global system for mobile communications (GSM), universal mobile telecommunication system (UMTS), wireless broadband (WiBRO), and the like. The communication interface 210 may be implemented as a communication chip, antenna, and/or a transceiver.

The camera 220 may be configured to capture an image. The camera 220 may include a front camera and a back camera. The front camera may be disposed in a user direction based on the display 230, that is, a display direction. The back camera may be disposed opposite to the display direction.

The display 230 is a structure for displaying an image, which may be, for example, implemented as a liquid crystal display (LCD), a cathode-ray tube (CRT), a plasma display panel (PDP), an organic light emitting diode (OLED) display, a transparent OLED (TOLED) display, or the like. The display 230 may be implemented as a touch screen type capable of sensing a touch manipulation of a user.

The memory 240 may, for example, include an internal memory or an external memory. The internal memory may include at least one of a volatile memory (e.g., dynamic RAM (DRAM)), static RAM (SRAM) or synchronous dynamic RAM (SDRAM), and so on), a non-volatile memory (e.g., one time programmable ROM (OTPROM), programmable ROM (PROM), erasable and programmable ROM (EPROM), electrically erasable and programmable ROM (EEPROM), mask ROM, flash ROM, and so on), a hard disk drive (HDD) or a solid state drive (SSD).

The external memory may include a flash drive, for example, a compact flash (CF), a secure digital (SD), a micro secure digital (micro-SD), a mini secure digital (mini-SD), an extreme digital (xD), a multi-media card (MMC), a memory stick, or the like.

The memory 240 is accessed by the processor 250, which stores data to the memory 240 and reads data from the memory 240 to control execution of operations of the control device 200.

The term "memory" used herein may include at least one of a memory provided separately from the processor 250 and ROM and RAM in the processor 250.

The processor 250 is a component for controlling an overall operation of the control device 200. For example, the processor 250 may control a number of hardware or software elements connected to the processor 250 by executing an operating system application, and perform various data processing and calculations. The processor 250 may be either a central processing unit (CPU) or a graphics-processing unit (GPU), or both. The processor 250 may be implemented as at least one general processor, a digital signal processor, an application specific integrated circuit (ASIC), a system on chip (SoC), a microcomputer, and the like.

A smart control application stored in the memory 240 may, when executed by the processor 250, control the control device 200 to perform operations of the embodiments which will be described below.

Figure 3:
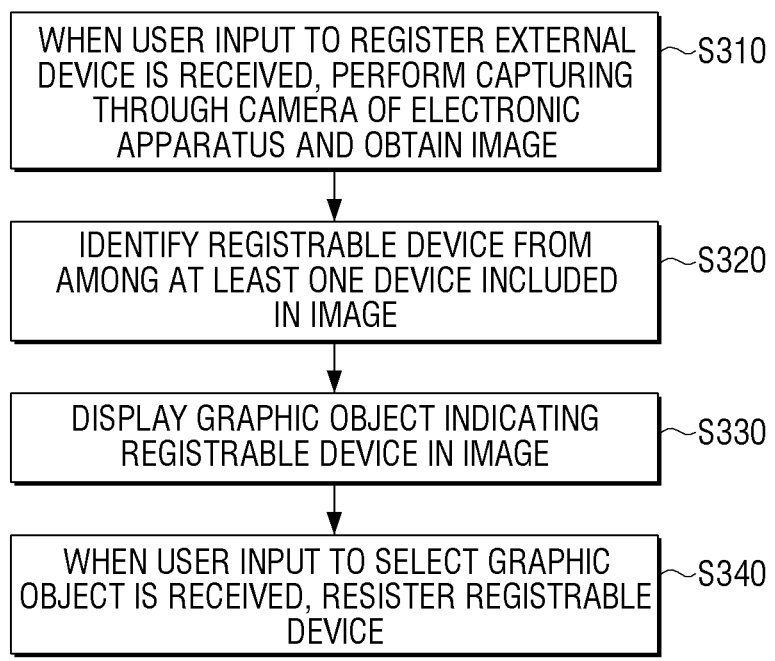
FIG. 3 is a flowchart of a method of controlling a control device, according to an embodiment.

FIG. 3 is a flowchart of a method of controlling a control device 200, according to an embodiment;

Referring to FIG. 3, when a user input to select an external device is received in the control device 200, capturing is performed through a camera of the control device 200 and an image is required, at operation S310.

The user input to select the external device may refer to, for example, selecting a user interface (UI) element for device registration provided in a smart control application or instructing, by voice, external device registration via voice recognition software (e.g., Bixby™) Alternatively, the control device 200 may, when an external registrable device is sensed via a Bluetooth Low Energy (BLE), automatically display a user interface (UI) inquiring whether the external device is registrable, and receive a user input consenting registration via the UI.

In addition, the control device 200 may, based on a signal received from an external device, identify a registrable device from among at least one device included in an image captured by a camera, at operation S320.

For example, in a case in which a controlled device 100 is included in a captured image, the controlled device 100 may transmit a signal in a wireless communication method, such as a Wi-Fi, Bluetooth, ZigBee, Z-wave, and the like, and the signal may include information about a type of the controlled device 100. The control device 200 may analyze the captured image and identify a type of the controlled device included in the captured image. The image analysis may be performed in the control device 200 itself. Alternatively, the control device 200 may transmit the captured image to an external server to perform image analysis, and receive information about devices (device group, device name, representative image, etc.) included in the image from the external server.

According to an embodiment, artificial intelligence technology may be used when image analysis is performed. In detail, a device may be identified from a captured image by using an artificial intelligence model trained by an artificial intelligence algorithm. For example, when an image captured is input to an artificial intelligence model as input data, as output data, information about a device, a location of device in the image, etc. may be obtained.

The artificial intelligence model is a determination model which is trained based on an artificial intelligence algorithm, which may be, for example, a model based on a neural network. The trained artificial intelligence model may be designed to simulate a human brain structure on the computer, and include a plurality of network nodes having weight values and simulating neurons of a human neural network. Each of the plurality of network nodes may form a connection relationship so that neurons simulate their synaptic activity exchanging signals through synapse. In addition, the trained artificial intelligence model may, for example, include a neuron network model or a deep learning model which is advanced from the neuron network model. A plurality of network nodes in the deep learning model may be positioned at different depths (or layers) from each other, and may exchange data according to a convolution connection relationship. For example, the trained artificial intelligence model may include a Deep Neural Network (DNN), Recurrent Neural Network (RNN), Bidirectional Recurrent Deep Neural Network (BDNR), etc., but the disclosure is not limited thereto.

The control device 200 may use a personal secretary program which is an AI-exclusive program (or artificial intelligence agent). The personal secretary program is an exclusive program for providing an artificial intelligence (AI)-based service. For artificial intelligence processing, the existing general processor (e.g., CPU) may be used, or a single-purpose processor (e.g., GPU, FPGA, ASIC, and the like) may be used. The control device 300 may include a plurality of processors, which may include, for example, a processor exclusive for AI and a processor handling other processing.

An AI-based operation may be performed in the control device 200 or may be performed through an external server. In the latter case, the control device 200 may, for example, transmit a captured image to an external server, and the external server may input the image to an artificial intelligence model and obtain information about a device in the image and information about a position, etc. as output data, and provide the obtained information to the control device 200. For example, at the time of image analysis, software, such as Cloud Vision™, Bixby Vision™, Google Lens™, and the like, may be used.

According to another embodiment, at the time of image analysis, prepared images of devices may be used. For example, images for introducing products in an online shopping mall may be used in image analysis. Since the images are captured from various angles, the control device 200 may compare the product images of various angles with the captured image and identify whether there exists a device similar to a product image. In the image analysis method, the control device 200 may receive product images from an external server and perform an operation of comparing the received product images with devices in the captured image.

The control device 200 may identify a device corresponding to information indicating a device type included in a signal received from an external device from among devices in an image identified through image analysis as a registrable device. That is, for example, in a case that information included in a signal received from external devices indicates the types of the external devices are a TV and a refrigerator and a TV and an air conditioner are identified as present in a captured image as a result of analyzing the captured image, the control device 200 may identify that the TV in the captured image is a registrable device.

If the controlled device 100 to be registered has already been connected to the AP 400, the control device 200 may receive, from the AP 400, information about the controlled device 100 connected to the AP 400, compare the received information with the image analysis result and identify that a device in common as a registrable device.

According to an embodiment, the control device 200 may include a panorama camera function. Accordingly, because an image may be captured at 360 degrees, it is possible to capture the entire interior of a space at once and identify all registrable devices in that space.

According to another embodiment, the control device 200 may obtain information about a location of at least one device included in a captured image through image analysis, identify a location (one of a distance and a direction) of at least one external device, and compare a location identified based on the image analysis with a location identified from a signal and identify a registrable device in the image.

In detail, the control device 200 may calculate a distance value according to a signal strength using a formula defining a received signal strength indicator (RSSI) and a distance.

In addition, the control device 200 may determine a direction of external devices based on signals received from external devices. A direction finding method may include an active type direction finding method and a passive type direction finding method. The active type direction finding method is a method of finding a direction in which the control device 200 broadcasts a radio wave and then receives a signal reflected from external devices. The passive type direction finding method is a method of finding a direction in which the control device 200 receives a signal broadcasted by external devices. According to an embodiment, the control device 200 may include two parallel antennas, and may use an amplitude comparison direction detection method to compare an amplitude size of a signal reaching two parallel antennas, a phase difference direction detection method to compare phases of signals reaching two parallel antennas, or a time difference direction detection method using a time difference between times at which a signal reaches two parallel antennas. The control device 200 may combine various direction detection methods for more precise direction detection. The control device 200 may match devices in an image with devices transmitting a signal based on a relative position of devices in an image and a relative position of devices identified through a signal received from the devices.

According to an embodiment, the control device 200 may, even in a case in which multiple same type of devices are present, distinguish one device from another device. As described above, positions of external devices identified based on a signal received from the external devices may be used.

For example, the control device 200 may, in a case a particular type of device, for example, a TV, is identified in a captured image and both a signal received from a first external device and a signal received from a second external device include information showing that the identified device is a TV, compare locations of the first and second external devices identified based on signals received from the first and second external devices with a position of a TV in the captured image, and identify an external devices corresponding to the TV in the captured image from among the first and second external devices.

In addition, the control device 200 may display at least one graphic object showing a registrable device in a captured image, at operation S330.

According to an embodiment, a graphic object showing a registrable device may be overlapped with a captured image and displayed. When the controlled device 100 is included in a captured image, a graphic object showing the controlled device 100 may be overlapped with a location at which the controlled device 100 is captured and displayed.

A graphic object may be of any form in which a registrable device may be identified in a captured image. For example, a graphic object may be overlapped with a registrable device in a captured image and displayed. For example, a graphic object may include information of a registrable device (e.g., a device name, a unique ID of a device, etc.).

A graphic object for identifying a registrable device may include text. According to an embodiment, the control device 200 may display text indicating the registrable device based on a type of at least one device identified through analysis of a captured image. According to another embodiment, the control device 200 may display text indicating a registrable device based on information included in a service set identifier (SSID) included in a signal received from an external device (the controlled device 100).

From the graphic object displayed on a captured image, a user can intuitively identify a registrable device based on a captured image.

A graphic object displayed on a captured image may function as a selectable UI element. A user may select a graphic object corresponding to a device for which registration is desired. Alternatively, a device image itself may function as a selectable UI element.

In addition, when a user input for selecting the at least one graphic object is received, the control device 200 may register a registrable device as a controllable device, at operation S340. Registering a controllable device may include at least one of enabling communication with a device, connecting a device to the AP 400, and transmitting information about a device to the server 300 so that the device is managed in the server 300.

According to an embodiment, on a captured image, a UI element for registration may be displayed along with a graphic object showing a registrable device. When a user selects a UI element for registration, a registration procedure for all registrable devices included in a captured image may be performed. Alternatively, as described above, a user can select only a device for which registration is desired, and thus, when a device is selected and a UI element for registration is selected, a registration procedure may be performed only with respect to the selected device.

The registration procedure may include performing, by the control device 200, communication connection with a registrable device. In a case of an initial communication connection, a pairing process may be performed between devices. In the pairing process, an input of a pin code (or a password) may be required for security reasons; however, pairing may be performed automatically. After pairing is performed, the devices may be connected to each other and exchange information. In addition, when a user input to register a registrable device is received, the control device 200 may receive device information from a registrable device, and transmit a registration request based on the received device information to the server 300.

In a case a plurality of registrable devices are identified in an image, when a user input to register the plurality of devices is received, the control device 200 may sequentially receive device information from the plurality of registrable devices and transmit a registration request based on the received device information to the server 300.

In a case a plurality of registrable devices are identified in an image and a plurality of registrable devices are registered as controllable devices, a plurality of registered devices may be designated as a first group. Accordingly, devices in a single location may be readily designated as one group. When a capturing and registration are performed at different locations, a new group may be automatically created. A group may be named a first group, a second group, etc. Alternatively, a location at which capturing is performed may be identified through image analysis and a name corresponding to the location may be created. For example, a group name, such as living room, kitchen, and the like, may be created.

When a user input to check a state of a particular group is received, the control device 200 may provide a user interface (UI) including images capturing a plurality of registered devices of the group and information about states of the plurality of registered devices.

After registration is performed, the control device 200 may control a registered device. In a case in which the controlled device 100 is registered, the control device 200 may transmit various control signals to the controlled device 100.

According to an embodiment, when a predetermined user input is received, the control device 200 may display a user interface (UI) including a captured image and a graphic object showing a registered device in the image. When a user input to select a registered device through the UI is received, the control device 200 may display a UI for controlling a registered device.

When state information for a registered device is received from the server 300, the control device 200 may display the state information along with an image captured by including the registered device. Accordingly, a user can identify state information of a device based on an image directly captured by the user, and thereby the user may intuitively know which device is referenced by the state information.

Figure 4:
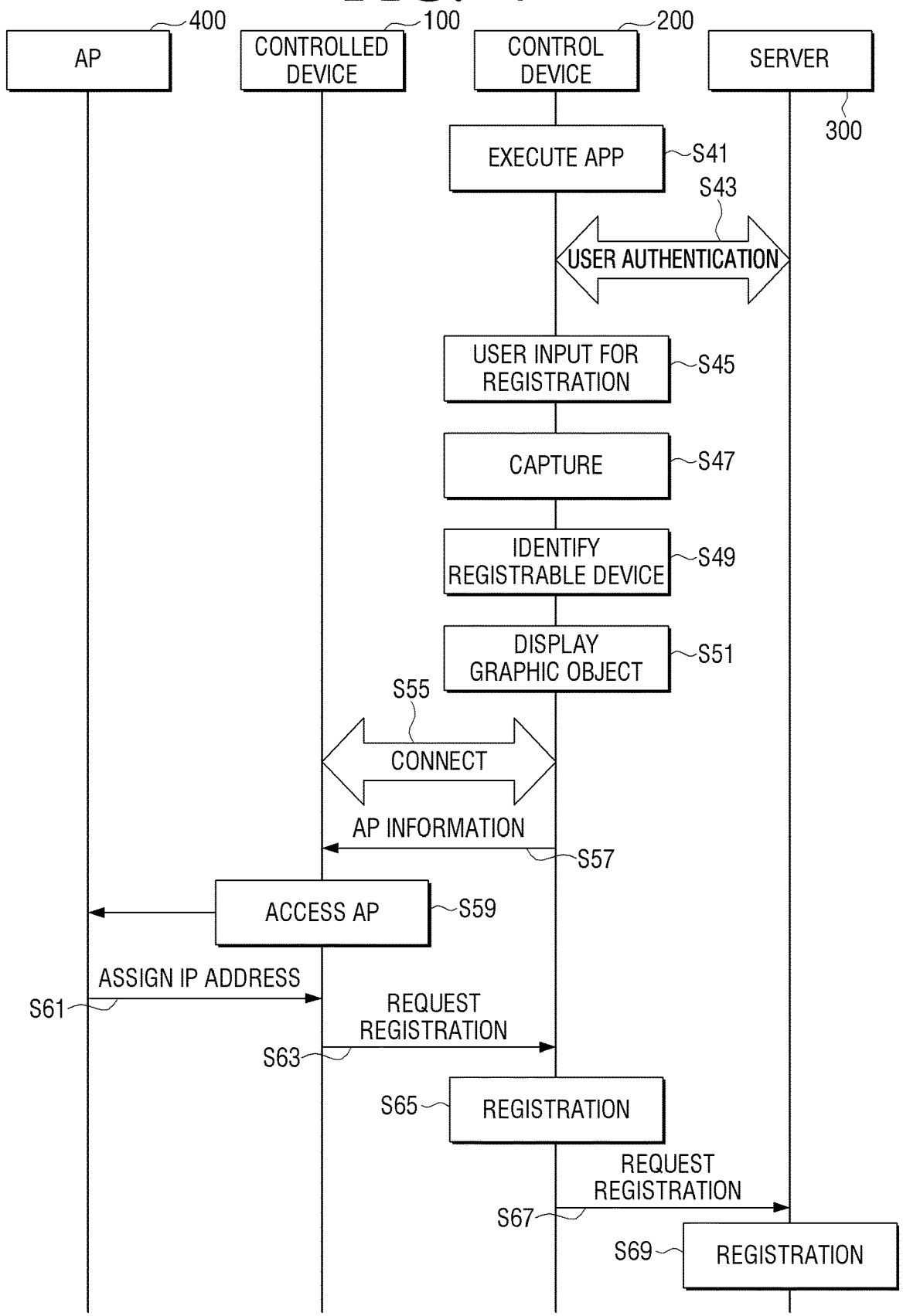
FIG. 4 is a flowchart of a method of registering a device, according to an embodiment.

FIG. 4 is a flowchart of a method of registering a device, according to an embodiment. Each of steps of the registration procedure and operations after registration will be described by referring to FIGS. 5-19.

Figure 5:
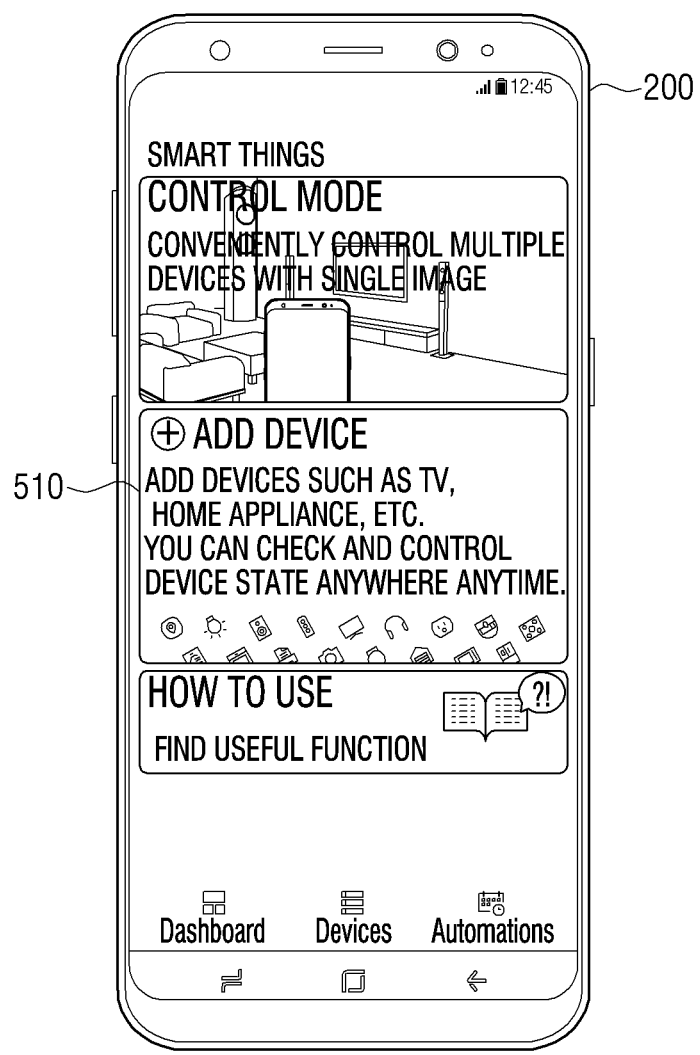
FIG. 5 is a diagram illustrating a user interface (UI) providing a menu for registering an external device, according to an embodiment.

Referring to FIG. 4, a user may execute a smart control application (APP) in a control device 200, at operation S41. The smart control application may be embedded in advance in the control device 200, or may be downloaded from an application store, such as Google Play™ and Samsung Apps™. FIG. 5 illustrates an example user interface (UI) which is displayed when a smart control application is executed in the control device 200.

In addition, the control device 200 may login to the server 300 by using login information, such as a user ID and password or biometric information (fingerprint, iris, voice, etc.). According to an embodiment, to login to the server 300, a user may be requested to input a user ID and password every time. According to another embodiment, login may be performed automatically when a smart control application is executed.

In addition, the control device 200 may receive a user input to register an external device, at operation S45. For example, a user may select a user interface (UI) element 510 to register an external device in a UI illustrated in FIG. 5.

Figure 6:
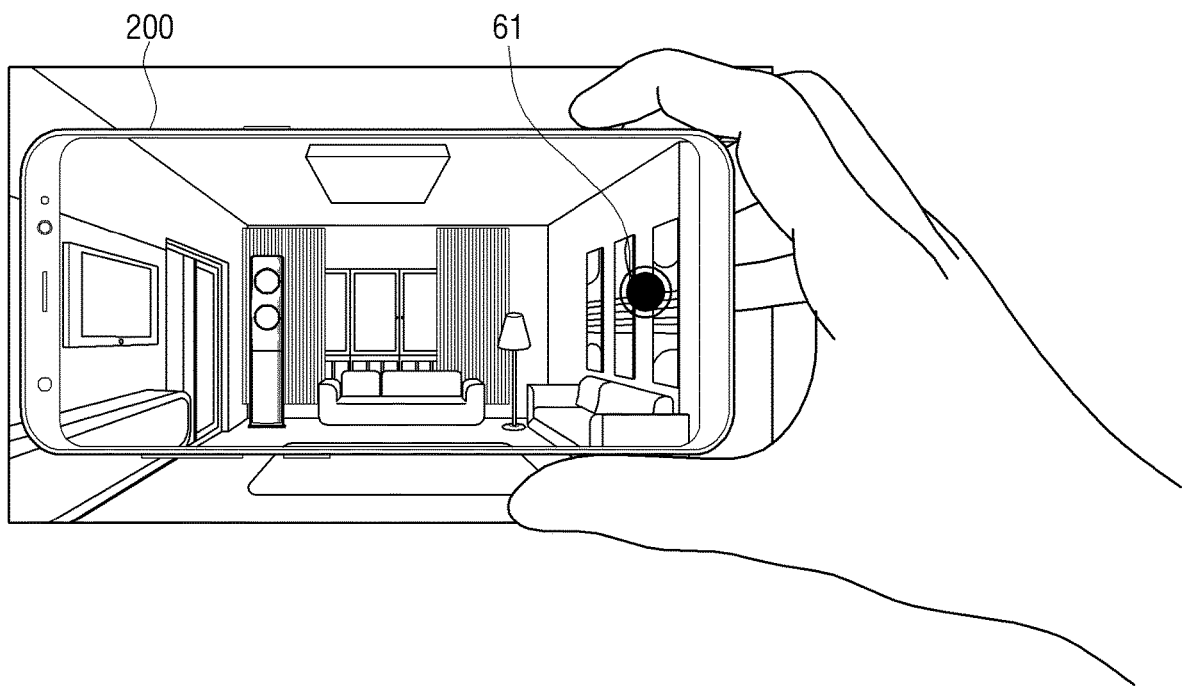
FIG. 6 is a diagram illustrating a situation in which capturing is performed to register an external device.

When a user input to select an external device is received, capturing is performed through a camera of the control device 200 and an image is required, at operation S47. For example, when a UI element 510 of FIG. 5 is selected, capturing may be performed through a camera of the control device 200 as illustrated in FIG. 6. In addition to a method of selecting the UI element 510, a UI inducing registration in a form of a pop-up message may be automatically displayed when a signal is received from a registrable device. When the UI is selected, capturing may be performed through a camera of the control device 200 as illustrated in FIG. 6.

In addition, the control device 200 may identify at least one registrable device from among the plurality of devices included in a captured image, at operation S49. An embodiment will be described on an assumption that the controlled device 100 is included in an image captured by the control device 200.

The controlled device 100 may transmit a signal in a wireless communication method, such as Bluetooth, ZigBee, Z-wave, and the like. The control device 200 receiving the signal may recognize the presence of the controlled device 100.

According to an embodiment, the controlled device 100 may support a communication protocol in a soft AP method. The controlled device 100 may execute the soft AP function and periodically transmit a beacon. The beacon is a signal broadcast by the controlled device 100 to notify surrounding devices of presence and timing of the controlled 100 so that the surrounding devices may detect the controlled device 100 and participate in mutual communication. The beacon may include a service set identifier (SSID), a beacon interval and capability information of the controlled device 100 and the like, may be variously expressed using a vendor specific field.

The soft AP function may be executed manually or automatically. According to an embodiment in which the soft AP function is manually executed, for example, a user may press a button provided in the controlled device to execute the soft AP function. According to an embodiment in which the soft AP function is automatically executed, when the controlled device 100 is in an unregistered state, the controlled device 100 may automatically execute the soft AP function. For example, when the user purchases the controlled device 100 and connects power, the controlled device 100 may automatically execute the soft AP function. According to an embodiment, a soft AP function of the controlled device 100 may be executed by the control device 200. For example, the control device 200 may transmit a signal (IR signal, ultrasonic signal, etc.) for executing a soft AP function to the controlled device 100.

According to an embodiment, an SSID included in a beacon received from the controlled device 100 may include a string from which a type of the controlled device to be recognized, and may be uniquely assigned for each individual device or each device of the same model. An SSID may be, if necessary, assigned dynamically or using a fixed rule through an application. In a case in which the controlled device 100 is, for example, a smart home device, an SSID may be created based on a smart home protocol (SHP) indicative of a smart home device, a device type, a manufacturing date, a version, etc. For example, in a case in which the controlled device 100 is a TV supporting a smart home function and is manufactured in the year of 2018, an SSID of the controlled device 100 may be implemented as "SHP.TV.2018".

In step S47, the control device 200 may analyze a captured image and identify what type of device is included in the image. In addition, from among devices included in an image, the control device 200 may identify a device corresponding to device information included in a signal received from an external device as a registrable device. For example, in a case in which a captured image is analyzed and the controlled device 100, which is a TV, is included in the image and a signal including an SSID "SHP.TV.2018" is received from the controlled device 100, the control device 200 may identify that a TV is a registrable device in the captured image.

According to an embodiment, if a plurality of devices of the same type are present, the control device may identify each of the devices. For example, there may be multiple TVs in a home. Referring to FIG. 6, there may be one TV in an image capturing a living room, but there may be another TV in a main room. In this case, it is necessary to determine whether a TV in the captured image is a TV corresponding to a signal received from the TV in the living room or a TV corresponding to a signal received from the TV in the main room.

To this end, according to an embodiment, it is possible to distinguish the same type of devices based on a shape of a device identified through image analysis. That is, devices are different because they have different designs for each manufacturer or for each model of the same manufacturer.

For example, referring to FIG. 6, through a comparison operation between various product images previously provided, it is possible to identify that a TV in the captured image is a product by Samsung with a model name "UN65NU7400E-S". In addition, when the control device 200 receives a signal including information corresponding to the model name "UN65NU7400E-S" from the TV in the living room and receives a signal including information corresponding to a model name "QN75Q9FAMFN" different from the model name mentioned above from the TV in the main room, the control device 200 may match the TV of the living room transmitting the signal including information corresponding to "UN65NU7400E-S" with the TV in the captured image.

According to another embodiment, the control device 200 may identify a distance between the control device 200 and external devices based on signals received from the external devices, a direction in which the external devices are disposed based on the control device 200, etc. In addition, the control device 200 may identify a correspondence between a device in the captured image and signals received from an actual device, based on positions of the devices in the image and the received signals.

According to an embodiment, the control device 200 may include a plurality of antennas. In addition, the control device 200 may compare amplitudes, phases, reception times, etc. of signals received through the plurality of antennas and identify a direction of a device transmitting a signal. For example, referring to FIG. 6, when the TV in the living room in the captured image is disposed in a left direction based on the control device 200 and though not visible, the TV in the main room is on the right side of the control device 200, the control device 200 may identify in which direction each of the TVs is disposed based on signals received from the TV in the living room and the TV in the main room, and recognize that the TV disposed on the left side in the image is a TV corresponding to a signal received from the TV in the living room.

According to another embodiment, the control device 200 may identify a relative position of external devices based on signals received from external devices using a plurality of antennas, identify a relative position of devices in an image, and compare the identified relative position of the external devices with the relative position of the devices in the image and identify a registrable device.

For example, referring to FIG. 6, the control device 200 may identify that relative to the device capturing the image an air conditioner is located on the right side of a TV, that a ceiling light is located on the right side of the air conditioner, and that a floor stand is located on the right side of the ceiling light through image analysis, and identify a relative position of devices transmitting signals based on a strength, phase difference, etc. of signals received from external devices. In addition, the control device 200 may compare a relative position identified through image analysis with a relative position identified based on the signals, and match devices in the image with signals received from the devices.

When a registrable device is identified, the control device 200 may display a graphic object showing a registrable device in a captured image, at operation SM. When a plurality of registrable devices are present, a graphic object showing each of the plurality of devices may be displayed.

Figure 7:
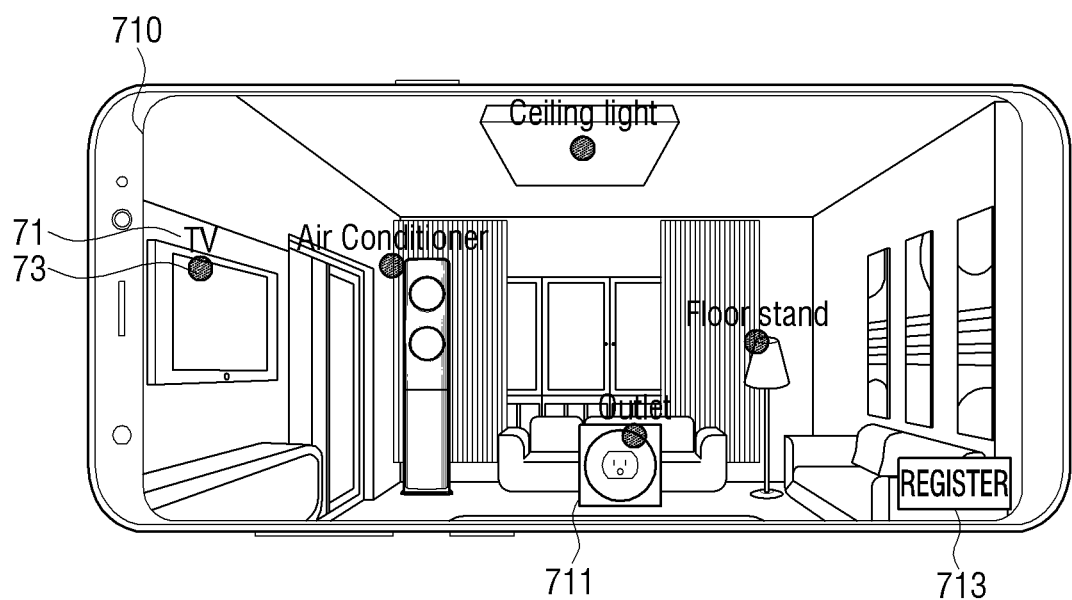
FIG. 7 is a diagram illustrating a user interface (UI) in which graphic objects showing registrable devices in a captured image are displayed, according to an embodiment.

A graphic object may be of any form from which a registrable device is identifiable. For example, as illustrated in FIG. 7, the control device 200 may display a text 71, such as TV, air conditioner, ceiling light, floor stand, and outlet, and an indicator 73 to show registrable devices in the captured image 710. If a device is too small to be seen clearly, a representative image 711 for the device may be displayed. A user may drag the representative image 711 and perform editing, such as moving from one position to another and the like. In addition, images capturing an actual device may be treated as objects capable of being edited and moved, and distinguished from a background and stored. For example, a TV image included in the image 710 may be moved through a drag input of a user. In addition, a user may edit a name of an object in the image 710. For example, the text "TV" 71 may be changed to "My TV".

Figure 8:
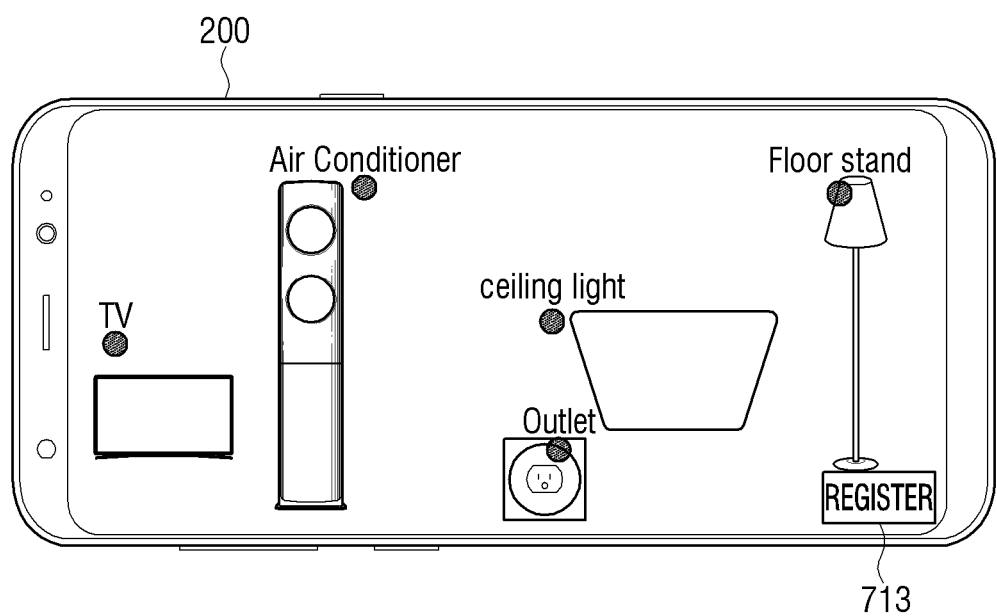
FIG. 8 is a diagram illustrating a user interface (UI) including representative images of registrable devices which may be provided when a capture function is not provided, according to an embodiment.
Figure 9:
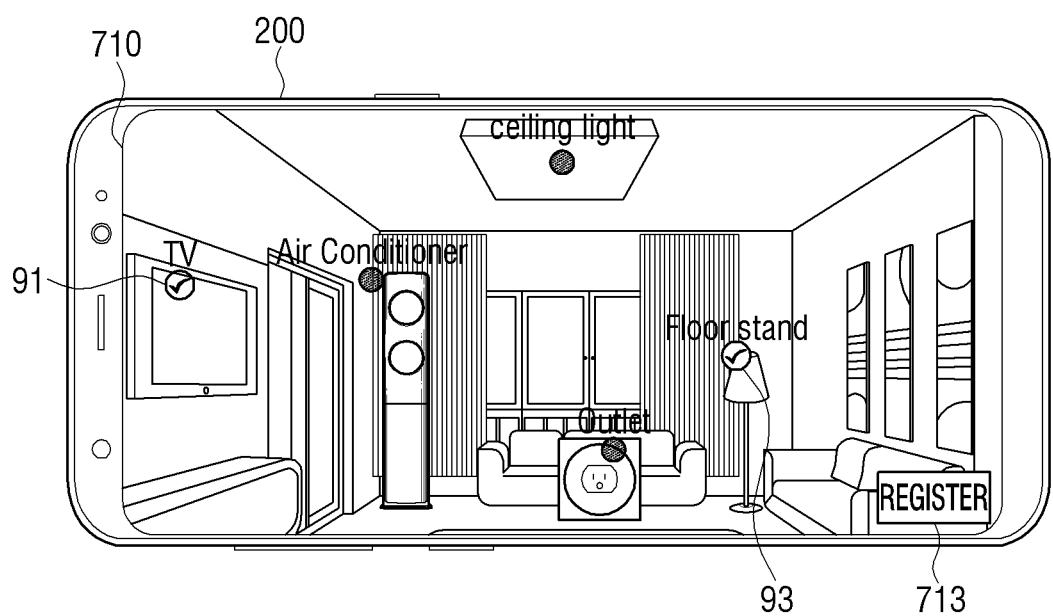
FIG. 9 is a diagram illustrating a user interface (UI) in which a device to be registered may be selected from among registrable devices, according to an embodiment.

According to another embodiment, when a camera function is not executed, representative images of registrable devices may be provided. For example, the control device 200 may transmit, to the server 300, information about external devices included in signals received from external devices or, in a case in which external devices are connected to the AP 400 in the same network, information about the external devices received from the AP 400. In addition, the control device 200 may receive information about the external devices (device group, device name, representative image, etc.) from the server 300. In addition, the control device 300 may, for example, as illustrated in FIG. 8, visualize registrable devices based on representative images received from the server 300 and corresponding to signals received from the devices. In the embodiment, determination of disposition of representative images may be made based on actual positions of external devices corresponding to signals received from the devices. For example, the control device 200 may identify positions of external devices based on strengths, phase difference, etc. of signals received from external devices, and arrange representative images based on the identified position.

The control device 200 may associate devices identified as registrable devices in the image 710 with information included in a signal received from each device and store the associated information in the memory of the control device 200. For example, the control device 200 may associate a TV identified in the image 710 to an SSID "SHP.TV.2018" actually received from the TV, associate an air conditioner identified in the image 710 to an SSID "SHP.Airconditioner.2018" actually received from the air conditioner, and so on. In this manner, the control device 200 may create a look-up table explaining a corresponding relationship and store the look-up table.

Thereafter, the control device 200 may enable a user input to register devices identified as registrable devices in an image. For example, a user may select a UI element 713 of FIG. 7 or 8. In this case, a registration procedure may be performed for all registrable devices included in the captured image. According to another embodiment, even if a UI element for registration is not additionally selected, a registration procedure may be performed solely by selecting a UI element 61 for capturing. That is, the registration may be automatically performed solely by capturing registrable devices.

Meanwhile, a graphic object 71 and 73, a UI element 713 for registration, etc. may be displayed after the UI element 61 for capturing is selected. Alternatively, they may be displayed in a camera preview state which is a state before a capture button is selected. That is, the control device 200 may analyze, in real time, a capture screen displayed through the control device 200 in the camera preview state and identify registrable devices. For example, in a situation as in FIG. 6, when a user moves the control device 200 to the right, the TV disappears from the captured image and thus, a graphic object indicating the TV may disappear as well.

According to an embodiment, a user may proceed with registration after selecting a device to be registered. For example, referring to FIG. 9, selection or deselection may be performed with respect to registrable devices. A selected state and an unselected state may be distinguishably displayed. For example, when a user selects a TV and a floor stand in the captured image 710, a check mark may be displayed on indicators 91 and 93 for the selected devices differently from indicators for unselected devices. In a state in which the TV and the floor stand are selected in the captured image 710, when a user selects the UI element 713 for registration, a registration procedure may be performed only for the TV and the floor stand.

Hereinafter, an embodiment of a registration procedure will be described in a case in which a user input requesting a collective registration of a TV, air conditioner, ceiling light, floor stand and outlet identified as registrable devices is received.

First, the control device 200 may perform communication connection with any device from among a TV, an air conditioner, a ceiling light, a floor stand, and an outlet, for example, a TV (the controlled device 100), at operation S55.

The communication connection may include a pairing process between devices. In the pairing process, an input of a pin code (or a password) may be required for security reasons; however, pairing may be performed automatically. The control device 200 may be simultaneously paired with the TV, the air conditioner, the ceiling light, the floor stand, and the outlet. In addition, a connection for mutually exchanging information may be sequentially performed for each device.

According to an embodiment using a soft AP function, the controlled device 100 may be operated as a soft AP and thus may permit access of the control device 200 like an AP.

In addition to the soft AP method, the controlled device 100 and the control device 200 may be connected through various communication methods, such as a Wi-Fi P2P communication method, Bluetooth Low Energy (BLE), Bluetooth, ZigBee, Radio Frequency (RF) communication, Z-wave, and the like.

When the controlled device 100 and the control device 200 are communicatively connected to each other, the control device 200 may transmit information about a pre-stored access point (AP) 400 to the controlled device 100, at operation S57. The control device 200 may store information about the AP 400 because the control device 200 has been connected to the AP 400. The information about the AP 400 may include, for example, an SSID, security type, encryption type, security key, etc. of the AP 400.

The controlled device 100 may access the AP 400 by using information about the AP 400 received from the control device 200, at operation S59. In addition, the controlled device 100 may be assigned an IP address from the AP 400, at operation S61. Thereby, the controlled device 100 may communicate with an external apparatus, such as the server 300, via the AP 400.

In addition, the controlled device 100 may transmit a registration request message including the assigned IP address and identification information of the controlled device 100 to the control device 200, at operation S63. The identification information of the controlled device 100 is information allowing another device to identify the controlled device 100, which may include, for example, a type, a name, a description, a manufacturer, a model ID, a serial number, a sales location, a version, and the like.

The control device 200 may register information received from the controlled device 100, at operation S65. The information received from the controlled device 100 may be used for registration request S67 of the controlled device 100.

Thereafter, although not illustrated, the control device 200 may be disconnected from the controlled device 100, and connected to the AP 400.

In addition, the control device 200 may transmit a registration request message requesting registration of the controlled device 100 to the server 300, at operation S67. The registration request message which is transmitted may include identification information of the controlled device 100, and further include information about an installation location of the control device 200.

The server 300 may register the controlled device 100 in a logged-in user account based on a registration request message received from the control device 200 in operation S69.

In the same manner as described above, registration for the remaining devices, an air conditioner, a ceiling light, a floor stand, and an outlet may be sequentially performed.

Figure 10:
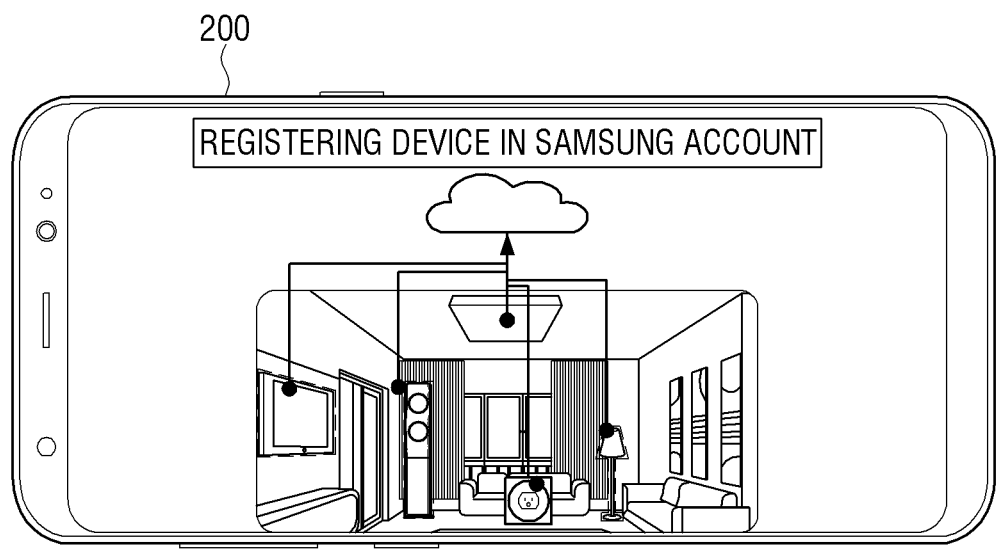
FIG. 10 is a diagram illustrating a user interface (UI) that may be displayed while a device is registered, according to an embodiment.

During the registration procedure described above, a UI informing that registration is in progress may be provided in the control device 200. For example, the control device 200 may provide a UI as illustrated in FIG. 10.

When the registration is completed, the control device 200 may provide a UI showing that the registration has been completed.

When a collective registration for a TV, an air conditioner, a ceiling light, a floor stand, and an outlet is completed, the control device 200 may designate the registered devices as one group. That is, devices in a single captured image may be designated as the same group. According to the related art, it is necessary to individually designate a group to each of devices; however, according to an embodiment, it is advantageous that a plurality of devices can be designated as one group only by photographing.

According to an embodiment, a user may manually designate a group name, or a group name may be automatically created. According to an embodiment, the control device 200 may identify a location at which a captured image is captured, such as a living room, a kitchen, or the like, and determine a name of the identified location as a group name. The control device 200 may provide a UI including grouped devices.

Figure 11:
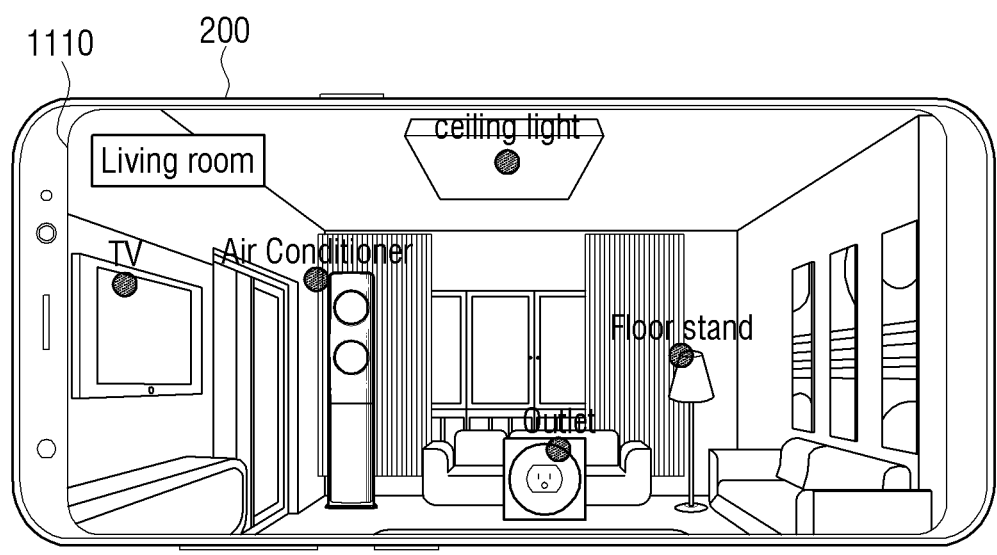
FIG. 11 is a diagram illustrating a user interface (UI) including information about devices assigned into groups after registration, according to an embodiment.

FIG. 11 illustrates a case in which a group name is designated as "Living room". It is possible that a group name, which is automatically created, is edited by a user afterwards. The control device 200 may display a user interface (UI) 1110 including a graphic object indicating registered devices and the group name. The UI 1110 for the group "living room" may be stored in the control device 200, the server 300, and the like, and then loaded according to a user request later on, and may be used for viewing and controlling state information of devices included in the group "living room".

Figure 12:
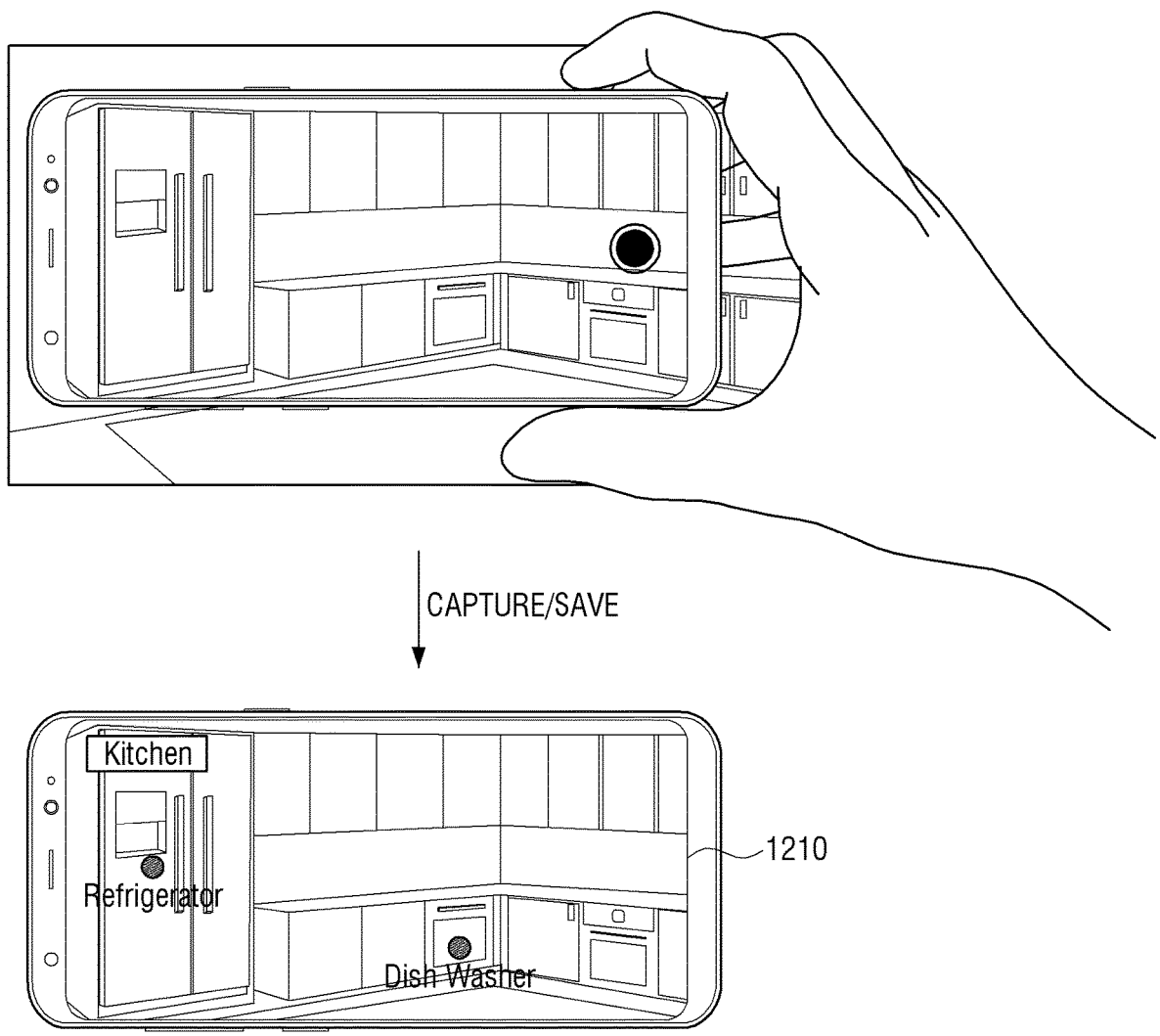
FIG. 12 is a diagram illustrating an embodiment to assign groups to devices.

FIG. 12 illustrates a situation in which a user captures a kitchen and registers devices. When a kitchen is captured, registrable devices in the kitchen may be registered as controllable devices and a group "Kitchen" may be created for the registered devices. A UI 1210 for the group "kitchen" may be used for viewing and controlling state information of devices included in the group "kitchen".

Figure 13:
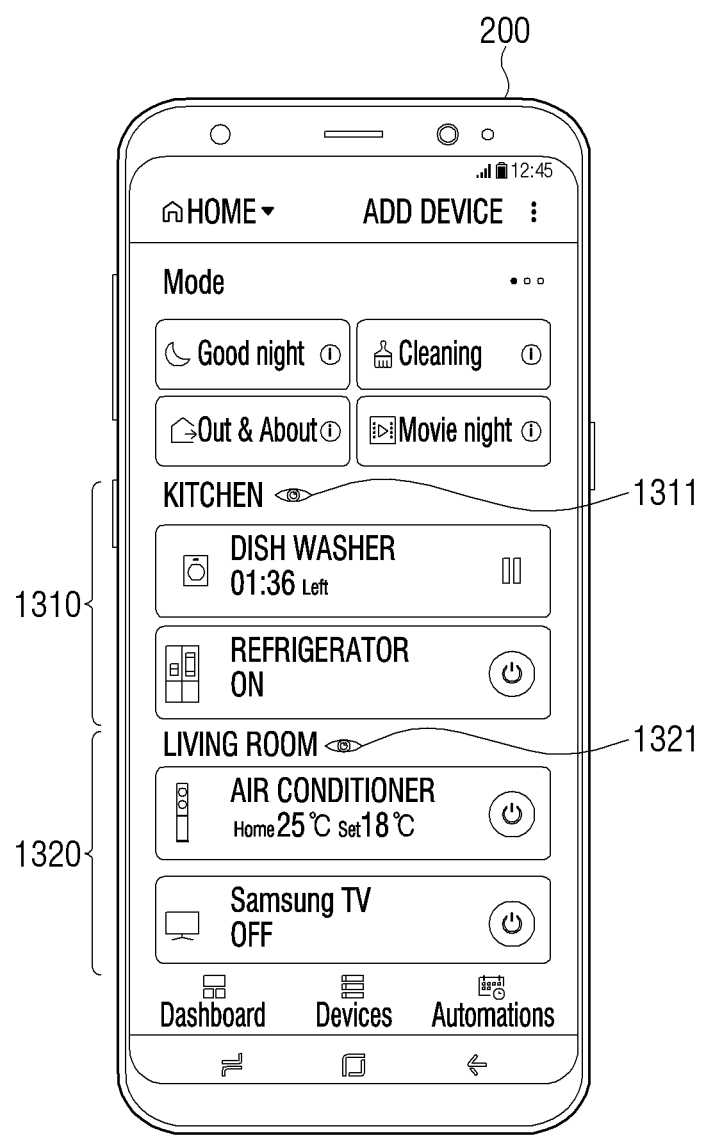
FIG. 13 is a diagram illustrating a user interface (UI) providing device information for each group, according to an embodiment.
Figure 18:
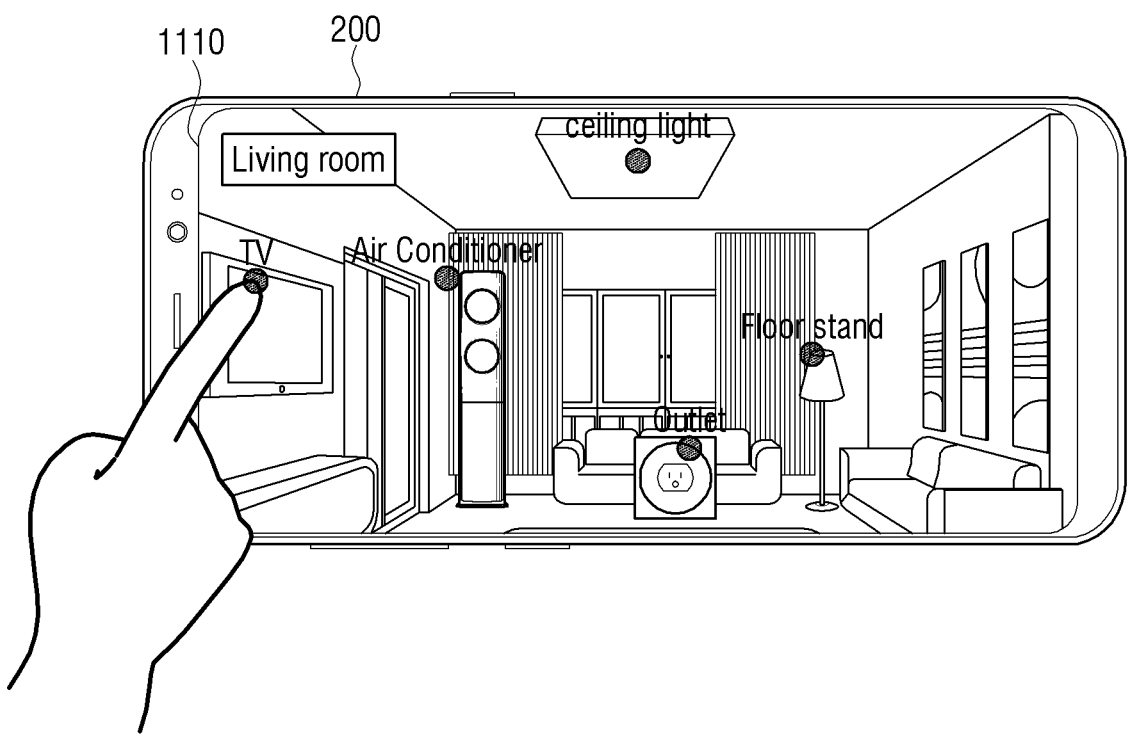
FIGS. 18 and 19 are diagrams illustrating user interfaces for device control, according to various embodiments.

By creating a group as described above, device management is possible for each group, and collective control for devices in the group is possible. For example, as illustrated in FIG. 13, a list UI for devices for each group may be provided. In this regard, the groups may be divided into a "kitchen" group 1310 and a "living room" group 1320 and a menu for displaying and controlling states of devices included in each group may be provided. In addition, the control device 200 may provide a UI element 1311 and 1321 for group viewing. For example, when a UI element 1311 is selected, the control device 200 may provide a UI 1210 for the group "kitchen" as illustrated in FIG. 12. When a UI element 1321 is selected, the control device 200 may provide a UI 1110 for the group "living room" as illustrated in FIG. 11 or 18. An embodiment of controlling a device by using a UI for a group will be described below with reference to FIGS. 18 and 19.

Figure 14:
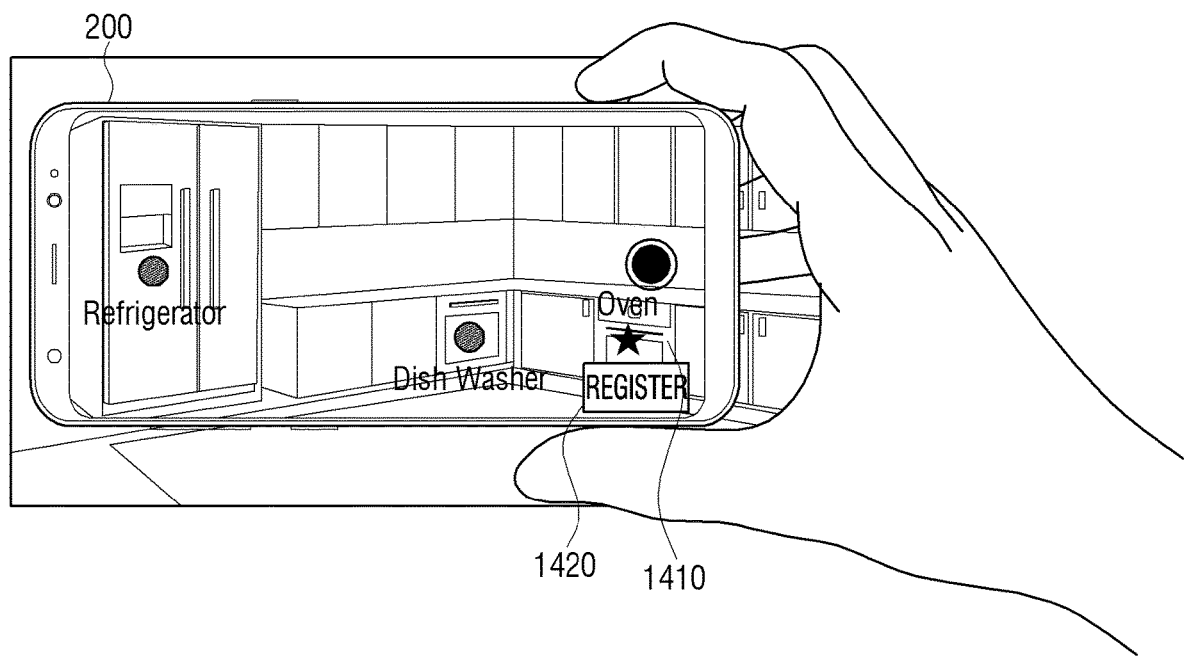
FIG. 14 is a diagram illustrating a user interface (UI) that may be provided when a new registrable device is sensed through capturing, according to an embodiment.

FIG. 14 is a diagram illustrating an embodiment of an environment in which a registered device and an unregistered device are present together.

Referring to FIG. 14, in a case in which a refrigerator and a dish washer are registered but an oven is not registered, and therefore an indicator of the oven may be displayed differently from the refrigerator and the dish washer. For example, as illustrated in FIG. 14, a circular graphic object may be displayed for the refrigerator and the dish washer and a star-shaped graphic object 1410 may be displayed for the oven. When a user selects the UI 1420 for registration, registration for the oven may be carried out.

Figure 15:
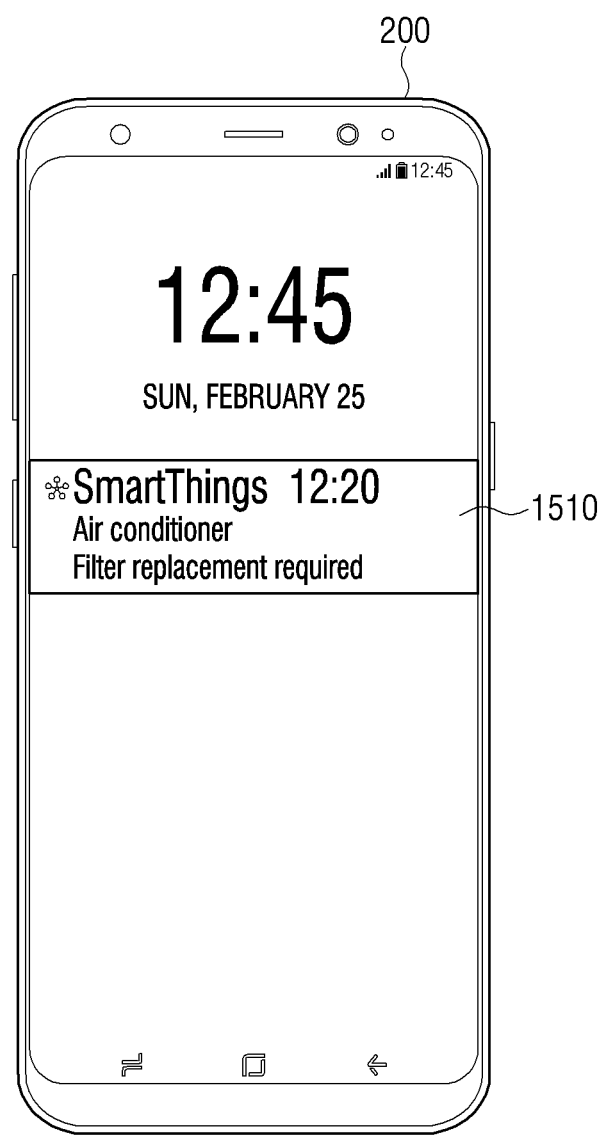
FIG. 15 is a diagram illustrating a device state notification user interface (UI), according to an embodiment.
Figure 16:
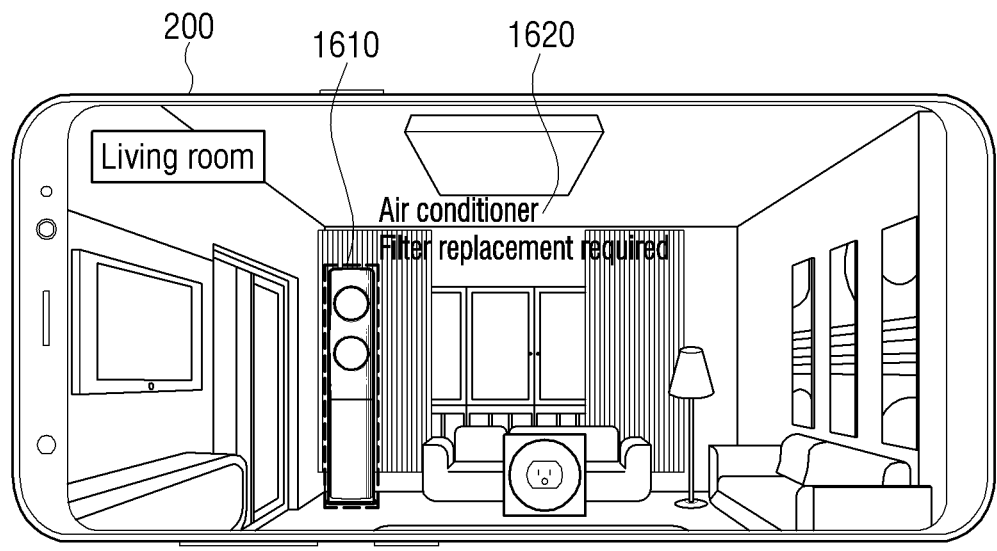
FIGS. 16 and 17 are diagrams illustrating a user interface (UI) providing state information, according to various embodiments.

FIGS. 15 and 16 are diagrams provided to explain an embodiment regarding state notification.

Referring to FIG. 15, when state information for a registered device is received from the server 300, the control device 200 may display a notification message 1510 as illustrated in FIG. 15. The notification message 1510 may be provided both in a locked state and an unlocked state of the control device 200. When a user selects the notification message 1510, the control device 200 may search for a UI for a group including a device corresponding to the received state information and provide the found UI as illustrated in FIG. 16. That is, state information 1620 may be displayed together with a UI for the group "living room" including the air conditioner corresponding to the state information. In this case, to further clearly indicate which device the state information corresponds to, for example, a graphic object 1610 in dotted lines illustrated in FIG. 16 for indicating a device may be displayed.

Even if the selection process of the notification message 1510 is not performed, if the state information of the device is received from the server 300, the UI shown in FIG. 16 may be provided.

Figure 17:
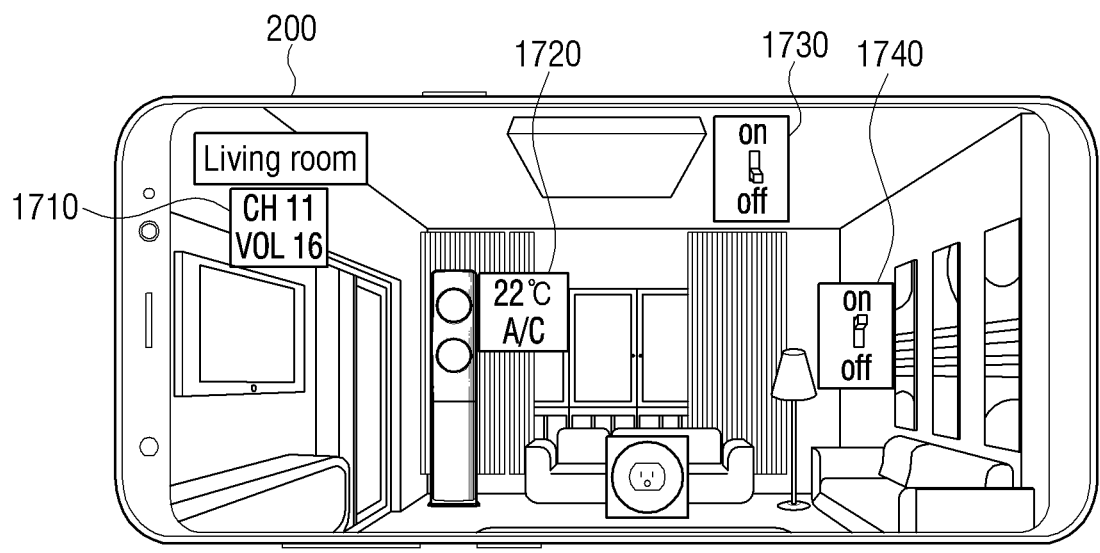

In addition, the control device 200 may provide a UI from which state information of registered devices can be identified at a glance of the display of the control device 200. For example, as illustrated in FIG. 17, state information UI elements 1710, 1720, 1730 and 1740 of each of the devices may be provided to a UI for the group "living room". The state information UI elements may be displayed near the corresponding devices.

According to an embodiment, brief information is provided in a state information UI element, and when a state information UI element is selected, detailed information may be provided. For example, when a user selects a state information UI element 1740 for a floor stand, the control device 200 may display detailed information regarding a brightness of the floor stand, the number of LEDs included in the floor stand, a remaining life of LED, and the like.

Figure 19:
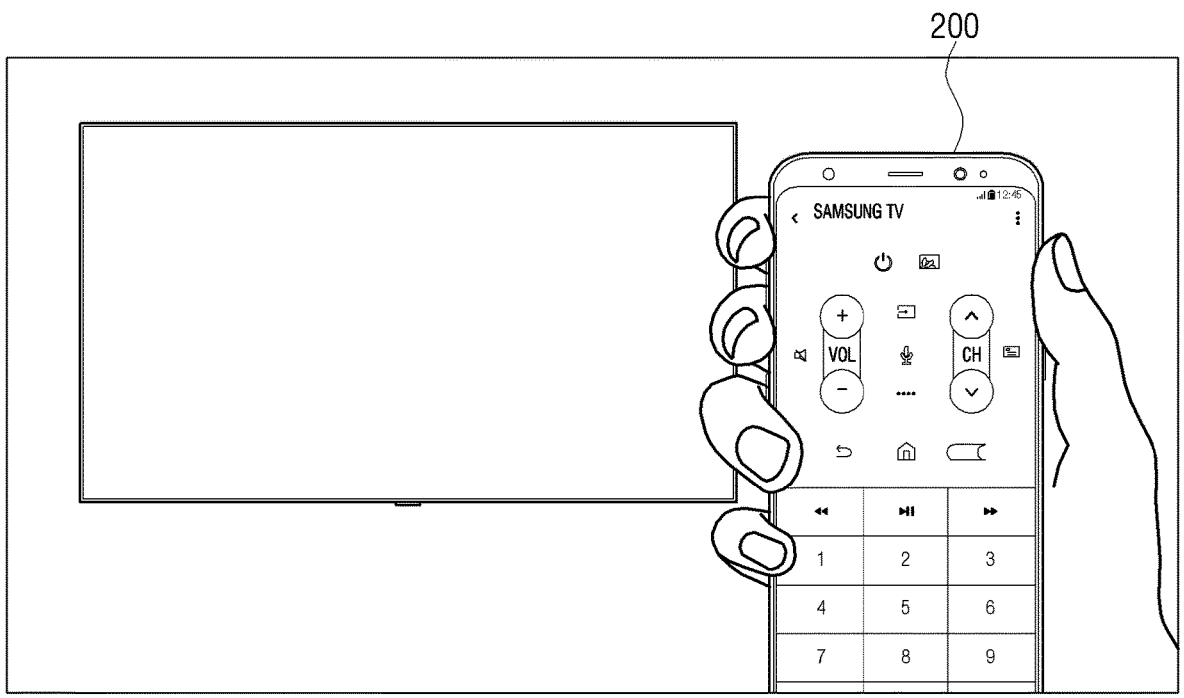

FIGS. 18 and 19 are diagrams provided to explain an embodiment for controlling a device by using a UI including registered devices.

Referring to FIG. 18, the control device 200 may provide a UI 1110 including a graphic object indicating registered devices. An image may be provided according to selection of the UI element 1321 for group viewing described above in FIG. 13, but is not limited thereto.

When a user selects a particular device in the UI 1110, the control device 200 may provide a UI screen capable of controlling the corresponding device. For example, when a user selects a TV in an image as illustrated in FIG. 18, the control device 200 may provide a UI capable of controlling the TV, as illustrated in FIG. 19. A UI for controlling a device may be provided on a separate screen from the UI 1110 of FIG. 18 as illustrated in FIG. 19, or may be provided in the UI 1110 of FIG. 18. In this case, for example, a UI for controlling a TV may be provided near a place where the TV in the UI 1110 of FIG. 18 is located.

According to the embodiments described above, a user can perform device registration more intuitively and easily. In the related art, names of registrable devices are only provided in the form of a list and therefore, it is difficult for the user to identify the actual device to which device name in the list corresponds. In addition, the names on the list are similar to each other, which makes it difficult to distinguish them from each other. In contrast, according to the embodiments described above, it is possible to intuitively identify devices through a captured image and it is easy to distinguish one device from another.

The various embodiments described above may be implemented as software, hardware, or a combination thereof. According to the hardware embodiment, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. According to a software implementation, embodiments such as the procedures and functions described herein may be implemented with separate software modules. Each of the software modules may perform one or more of the functions and operations described herein.

The above-described embodiments may be implemented as a software program including an instruction capable of being stored on machine (e.g., computer)-readable storage media. The machine is an apparatus which is capable of reading a stored instruction from the storage medium and executing according to the instruction, and may include a control device 200 according to the above-described embodiments.

When the instruction is executed by a processor, the processor may control the device to perform a function corresponding to the instruction directly or using other components under the control of the processor. The instruction may include a code generated or executed by a compiler or an interpreter. For example, an instruction stored in storage media may be executed by a processor, and thereby a method for controlling a control device 200 described above may be executed. For example, based on an instruction stored in storage media being executed by a processor of a device (or an electronic apparatus), when a user input to register an external device is received, a controlling method comprising, when a user input to register an external device is received, performing capturing through a camera of the device and obtaining an image, identifying a registrable device from among at least one device included in the image based on a signal received from an external device, displaying a graphic object indicating the registrable device in the image, and when a user input for selecting the at least one graphic object is input, registering the registrable device as a controllable device may be performed.

A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an embodiment, the method according to the above-described various embodiments may be provided as being included in a computer program product. The computer program product may be a product between a seller and a consumer. The computer program product may be distributed online in the form of machine-readable storage media (e.g., compact disc read only memory (CD-ROM)) or through an application store (e.g., Play Store™ and App Store™). In the case of online distribution, at least a portion of the computer program product may be at least temporarily stored or temporarily generated in a server of the manufacturer, a server of the application store, or a storage medium such as memory.

Each of the components (e.g., module or program) according to the various embodiments may include a single entity or a plurality of entities, and some of the corresponding sub components described above may be omitted, or another sub component may be further added to the various embodiments. Alternatively or additionally, some components (e.g., module or program) may be combined to form a single entity which performs the same or similar functions as the corresponding elements before being combined. Operations performed by a module, a program, or other component, according to various exemplary embodiments, may be sequential, parallel, or both, executed iteratively or heuristically, or at least some operations may be performed in a different order, omitted, or other operations may be added.

The foregoing embodiments and advantages are merely exemplary and are not to be construed as limiting the disclosure. The disclosure may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. A method of registering at least one external device on an electronic device, the method comprising:
    capturing an image including a plurality of devices through a camera of the electronic device;
    obtaining first information on the plurality of devices, from the image;
    receiving second information on the plurality of devices from the plurality of devices;
    identifying the plurality of devices included in the image, based on the second information and the first information;
    designating the plurality of devices as a group of the plurality of devices; and
    collectively registering the group of the plurality of devices on the electronic device,
    wherein the first information comprises designs of the plurality of devices,
    wherein the capturing the image comprises capturing an entire interior of a space at once by a panorama camera function of the camera,
    wherein the identifying the plurality of devices included in the image comprises identifying all registrable devices in the entire interior of the space and distinguishing a same type of the plurality of devices based on the designs of the plurality of devices, and
    wherein the identifying the plurality of devices included in the image further comprises:
        identifying first positions of the plurality of devices through image analysis;
        identifying second positions of the plurality of devices based on a strength and phase difference of a signal received from the plurality of devices;
        comparing the first positions and the second positions; and
        identifying the plurality of devices based on results of the comparing.

2. The method as claimed in claim 1, further comprising:
    receiving state information of the plurality of devices from a server; and
    displaying the image together with an indication of the state information.

3. The method as claimed in claim 1, further comprising:
    displaying a user interface (UI) for controlling the plurality of devices; and
    transmitting a control command to control the plurality of devices based on receiving a user input via the UI for controlling the group of the plurality of devices.

4. The method as claimed in claim 1, wherein the identifying comprises identifying the plurality of devices through an artificial intelligence model.

5. The method as claimed in claim 1, wherein the second information comprises a service set identifier (SSID).

6. The method as claimed in claim 1, further comprising:
    displaying a user interface (UI) for controlling the plurality of devices including information about states of the plurality of devices.

7. The method as claimed in claim 1, wherein the collectively registering comprises:
    receiving device information from the plurality of devices; and
    transmitting a registration request based on of the device information to a server.

8. A non-transitory computer-readable storage medium configured to store computer executable instructions that, when executed by a processor of an electronic device, cause the electronic device to perform a method of registering at least one external device on the electronic device, the method comprising:
    capturing an image including a plurality of devices through a camera of the electronic device;
    obtaining first information on the plurality of devices, from the image;
    receiving second information on the plurality of devices from the plurality of devices;
    identifying the plurality of devices included in the image, based on the second information and the first information;
    designating the plurality of devices as a group of the plurality of devices; and
    collectively registering the group of the plurality of devices on the electronic device,
    wherein the first information comprises designs of the plurality of devices,
    wherein the capturing the image comprises capturing an entire interior of a space at once by a panorama camera function of the camera,
    wherein the identifying the plurality of devices included in the image comprises identifying all registrable devices in the entire interior of the space and distinguishing a same type of the plurality of devices based on the designs of the plurality of devices, and
    wherein the identifying the plurality of devices included in the image further comprises:
        identifying first positions of the plurality of devices through image analysis;
        identifying second positions of the plurality of devices based on a strength and phase difference of a signal received from the plurality of devices;

comparing the first positions and the second positions; and identifying the plurality of devices based on results of the comparing.

9. The non-transitory computer-readable storage medium as claimed in claim 8, wherein the method further comprises:

receiving state information of the plurality of devices from a server; and displaying the image together with an indication of the state information.

10. The non-transitory computer-readable storage medium as claimed in claim 8, wherein the method further comprises:

displaying a user interface (UI) for controlling the plurality of devices; and transmitting a control command to control the plurality of devices based on receiving a user input via the UI for controlling the group of the plurality of devices.

11. The non-transitory computer-readable storage medium as claimed in claim 8, wherein the identifying comprises identifying the plurality of devices through an artificial intelligence model.

12. The non-transitory computer-readable storage medium as claimed in claim 8, wherein the second information comprises a service set identifier (SSID).

13. The non-transitory computer-readable storage medium as claimed in claim 8, wherein the method further comprises displaying a user interface (UI) for controlling the plurality of devices including information about states of the plurality of devices.

* * * * *